United States Patent [19]
Grube et al.

[11] Patent Number: 5,638,423
[45] Date of Patent: Jun. 10, 1997

[54] METHOD OF DETECTING USE OF A STOLEN COMMUNICATION UNIT

[75] Inventors: Gary W. Grube, Palatine; Timothy W. Markison, Hoffman Estates, both of Ill.

[73] Assignee: Motorola, Inc., Schaumburg, Ill.

[21] Appl. No.: 570,139

[22] Filed: Dec. 11, 1995

Related U.S. Application Data

[63] Continuation of Ser. No. 226,732, Apr. 12, 1994, abandoned.

[51] Int. Cl.$^6$ ........................................... H04Q 7/20
[52] U.S. Cl. ........................ 379/58; 379/62; 455/54.2; 455/349
[58] Field of Search .......................... 379/56, 58, 59, 379/61, 62, 201, 211; 455/33.1, 54.1, 89, 229, 54.2, 88, 349; 340/539; 235/380, 382

[56] References Cited

U.S. PATENT DOCUMENTS

| | | | |
|---|---|---|---|
| 4,275,385 | 6/1981 | White | 379/211 |
| 4,932,050 | 6/1990 | Davidson et al. | 379/201 |
| 4,999,613 | 3/1991 | Williamson et al. | 340/573 |
| 5,051,741 | 9/1991 | Wesby | 340/539 X |
| 5,223,844 | 6/1993 | Mansell et al. | 342/357 |
| 5,224,151 | 6/1993 | Bowen et al. | 379/56 |
| 5,239,294 | 8/1993 | Flanders et al. | 379/62 |
| 5,255,306 | 10/1993 | Melton et al. | 379/58 X |
| 5,266,782 | 11/1993 | Alanara et al. | 235/380 |
| 5,335,265 | 8/1994 | Cooper et al. | 379/59 |
| 5,335,276 | 8/1994 | Thompson et al. | 379/58 |
| 5,402,104 | 3/1995 | La Rosa | 340/539 |
| 5,416,468 | 5/1995 | Baumann | 340/539 X |

*Primary Examiner*—Dwayne Bost
*Assistant Examiner*—William G. Trost
*Attorney, Agent, or Firm*—Christopher P. Moreno

[57] ABSTRACT

Unauthorized access of a wireless communication system may be prevented by providing a communication apparatus. The communication apparatus includes a communication unit (102) and a proximity user card (115). The proximity user card (115) communicates user identification information with the communication unit (102) over a second RF communication path (119). The user identification information indicates whether the proximity (115) is within a predetermined distance of the communication unit (102). When the proximity user card (115) is separated by more than the predetermined distance, the communication unit (102) will transmit an invalid proximity message to the central controller (101).

10 Claims, 2 Drawing Sheets

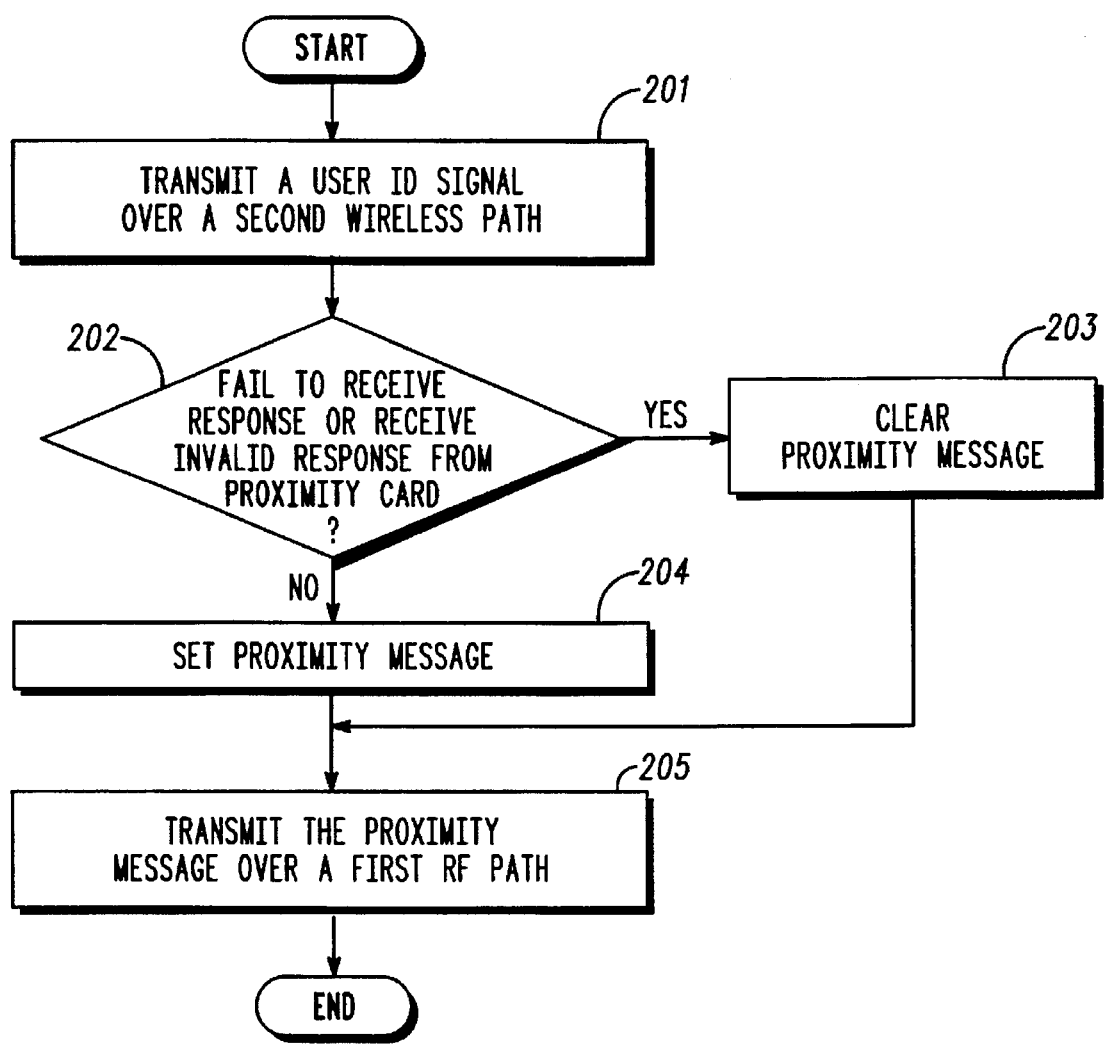

METHOD OF DETECTING USE OF A STOLEN COMMUNICATION UNIT

This is a continuation of application Ser. No. 08/226,732, filed Apr. 12, 1994 and now abandoned.

Field of the Invention

This invention relates generally to wireless communication systems, and in particular, to a method for detecting use of a stolen communication unit.

BACKGROUND OF THE INVENTION

Wireless communication systems are known to include a communication resource allocator, a plurality of communication units, a plurality of communication resources, and repeaters. The communication units may be mobile units which are mounted in vehicles, portable units which are carded about by the person, or cellular telephones.

Due to the size of most communication units, they are often misplaced and/or are subjected to being stolen. When a communication unit is stolen, the person in possession has access to the communication system. This situation is further worsened when the communication unit is a secure communication unit and the encryption key and algorithm were programmed into the radio. Thus the person in possession of the stolen unit would be able to listen to secure communications. This scenario is further worsened when the communication unit is that of a police officer or fire department personnel. In these situations, the person in possession of the radio can monitor police activity or disrupt police activity by transmitting via the communication unit.

In a large metropolitan area, it is estimated that at least one communication unit is stolen from a policeman each day. This presents a significant problem to the operators of the communication system. Such a problem allows less than scrupulous people access to the police channels and as mentioned above could disrupt service. In addition, a stolen radio may be reverse engineered and subsequently used on the system. Therefore, a need exists for detecting and preventing access to a wireless communication system by an unauthorized or stolen communication unit.

BRIEF DESCRIPTION OF THE DRAWINGS

FIG. 2 illustrates a logic diagram that may be used to implement the present invention.

DESCRIPTION OF A PREFERRED EMBODIMENT

Figure 1:
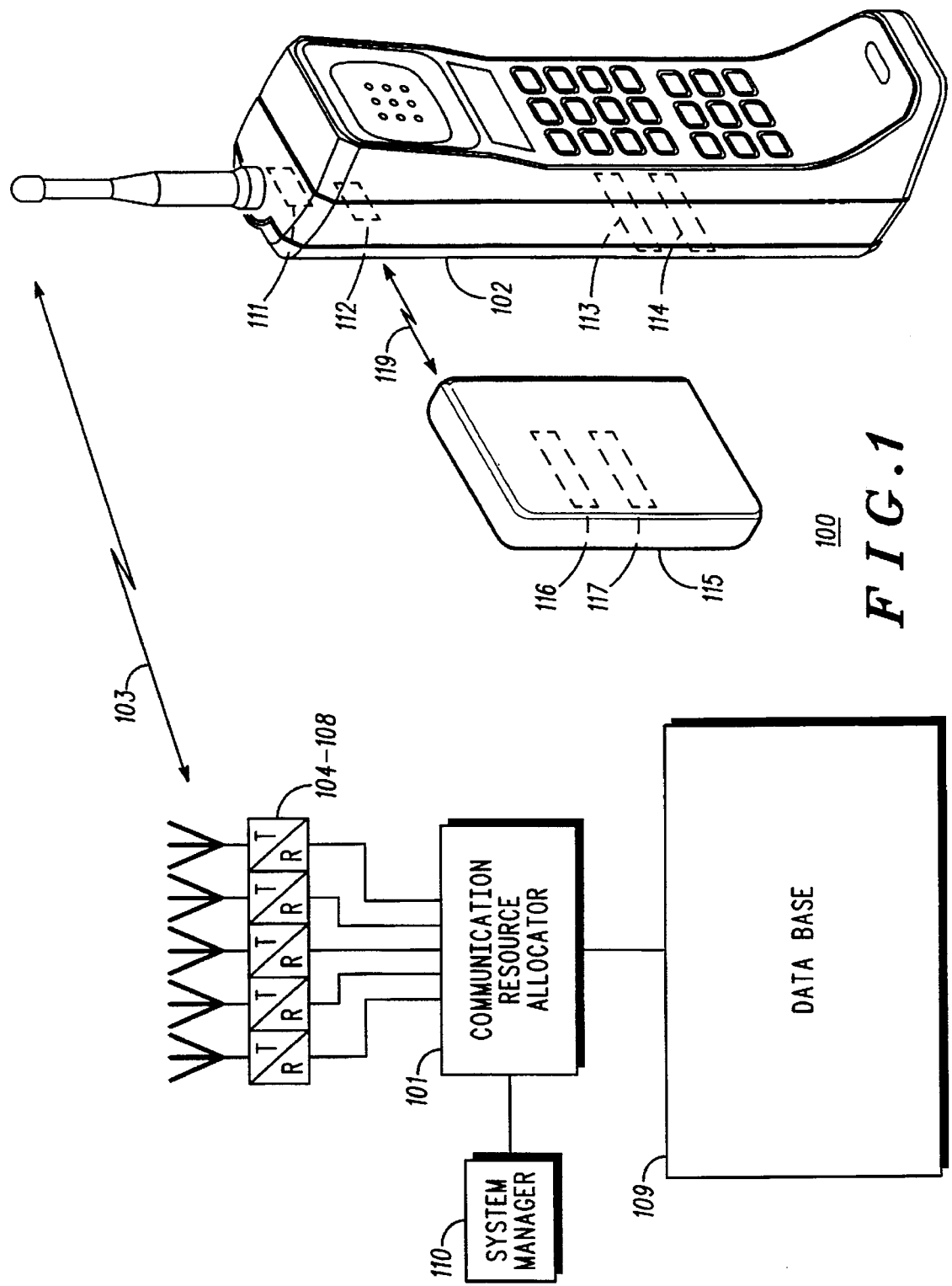
FIG. 1 illustrates a wireless communication system in accordance with the present invention.

Generally, the present invention provides a method and apparatus for preventing the unauthorized use of a communication unit in a wireless communication system. This is accomplished by providing a proximity user card with the communication unit, wherein the proximity user card transmits user identification information over a second RF communication path to the communication unit. When the distance between the proximity user card and the communication unit exceeds a predetermined value, a message is sent by the communication unit to the central controller indicating that the predetermined distance has been exceeded. The central controller may utilize this information to detect the location of the particular communication unit. With such a method and apparatus, a stolen communication unit can be detected and its location may be determined such that the communication unit may be retrieved and the person in possession of the stolen radio may be apprehended.

The present invention can be more fully described with reference to FIGS. 1 and 2. FIG. 1 illustrates a wireless communication system 100 that includes a communication resource allocator, or central controller (101), a plurality of communication units (102), a plurality of communication resources (103), repeaters (104–108), a database (109), and a system manager (110). The communication unit (102) along with a proximity user card (115) comprise a communication apparatus.

The communication unit (102), which may be a Sabre radio manufactured by Motorola, or a Radius radio manufactured by Motorola, includes a first transceiver (111), a second transceiver (112), a processor (113), and memory (114). The first transceiver (111) provides a mechanism for the communication unit to transceive information with the communication resource allocator (101), via the communication resources (103) or a first RF communication path. The first transceiver (111) may be any type of RF receiver and transmitter. The second transceiver (112), transceives information over a second wireless path (119) which may be an RF path, with the proximity user card (115). The second transceiver (112) is coupled to a processor (113) which may be any processing device, such as a microprocessor, and to memory (114) which may be any device for storing digital information.

The proximity user card (115) includes a transceiver (116) and a user identification response element (117). In order to communicate via the second RF communication path, the transceiver (116) and the second transceiver (112) must include an RF transmitter and receiver. Note that the carrier frequency of the second RF communication path may be the same carrier frequency as that of the first RF communication path, wherein the transmit powers of the communication unit (102), and the proximity user card (115) are set to power levels where the range is less than 20 feet.

The user identification response element (117) of the proximity user card (115) may be any device for storing user identification information. For example, the user identification response element (117) may be an RF tank circuit that includes a resonant capacitor and resonant conductor which are tuned to the frequency of the second RF communication path. Continuing with the example, if the second RF communication path is an RF path having a carder frequency of 200 MHz, the tank circuit would be tuned to have its center frequency at 200 MHz. Thus, when the communication unit transmits a user identification signal, which in this case would be a 200 MHz signal, to the proximity user card (115), the tank circuit (117) would pass the signal through relatively unchanged and retransmit the 200 MHz signal back to the communication unit. Upon receipt of the returned signal, the processor (113) would determine that it is relatively unaltered, thus the proximity card is within range.

Alternatively, the tank circuit may be tuned to a unique frequency for that particular proximity card such that no other proximity card has that exact frequency. The communication unit would also be tuned to that particular frequency such that when the user identification signal was transmitted, it would be transmitted at that unique frequency.

Yet another Alternative, the user identification response element (117) may be a memory device which is addressed by the user identification signal transmitted by the communication unit. To access the user response (117), the communication unit transmits an address signal, as the user identification signal, to the proximity user card (115) which accesses a particular entry of the memory device. Within this memory device, a unique code may be stored which is subsequently transmitted back over the second RF communication path (119) to the communication unit. Upon receiving this unique identification code, the processor determines whether this is the appropriate response to its user identification signal transmitted. As should be readily appreciated by one skilled in the art, the information stored in the user identification response element (117) may be as simple or as complex as desired.

FIG. 2 illustrates a logic diagram that may be used to implement the present invention. At step (201) the communication unit transmits user identification information, or signal, over a second RF communication path to a proximity user card. If the proximity user card has received the user identification signal, the proximity user card prepares a response as described above. It is contemplated that the transceiving range between the proximity user card and the communication unit will be approximately 20 feet. However, to those skilled in the art this range may be varied according to user or system needs.

If the proximity user card has transmitted a response, the communication unit checks to determine whether it has received the response (202). If the response is received and verified, the communication unit clears any indication of an proximity message (203). If, however, the response was not received, or the response was inappropriate, the communication unit sets the proximity message (204). Regardless of whether the proximity message is set or not, the proximity message is transmitted over a first RF communication path to the central controller (205). The proximity message may be as simple as a single bit included in an inbound signaling word or as complex as transmitting an encoded version of the response from the proximity user card (115). As should be apparent to one skilled in the art, the proximity message may be varied to meet the requirements of the system.

Upon receipt of the proximity message, the controller determines whether it is set or not. If the proximity message is set, the proximity user card did not transmit an appropriate response. Thus, the central controller may transmit the proximity message to a system manager which in turn prepares a response. The response from the system manager may be to disable the particular communication unit or to grant the service requested by the communication unit.

If the proximity message is set, i.e., indicating that the proximity user card did not send a proper response or did not respond at all, the central controller may determine the geographic location of the communication unit, such that the unit may be reclaimed and the person in possession apprehended. The location may be determined in a variety of ways, i.e., by the location of the site that the communication unit is transmitting in, or by initiating some other location mechanism.

As a working example, assume that the communication unit (102) is a portable radio, or cellular telephone, and the proximity user card (115) is manufactured in such a way as to be readily carried about by the person. Thus, the proximity user card (115) may be manufactured in the size of a credit card, an employee badge, or token carried in a pocket.

With the proximity user card (115) on, or about, the person operating (operator) the communication unit (102), any system service requests desired by the operator will be transmitted with a valid (i.e., cleared) proximity message. Upon receiving the service request, the central controller (101) will verify the proximity message, and process the request when the indication is valid. If, however, the communication unit is stolen from the operator, any system service requests will include an invalid (i.e., cleared) proximity message, because the distance between the proximity user card (115) and the unit (102) will exceed the predetermined distance. Upon receiving a service request with an invalid (i.e., set) proximity message, the central controller (101) will send a message to the system manager (110). The system manager will then decide how to respond.

In addition, if the operator forgets his/her proximity user card (115), the operator can inform the system manager (110) of the situation, such that the system manager can direct the central controller to process the requests from the operator's communication unit even though it does not have a valid proximity message.

Further, unauthorized communication units may be detected, where an unauthorized communication unit is one that was not purchased by the operator of the system, but has, through illegitimate means, obtained a valid communication unit ID. However, when an unauthorized unit transmits in a request, it will not include a valid proximity message, thus alerting the system manager of the unauthorized unit.

The present invention provides a method and apparatus for preventing unauthorized access to a communication system. With such a method, use of a stolen communication unit may be detected and the unit reclaimed. In addition, the stolen radio may be disabled preventing secure information from being intercepted and preventing the person in possession of the stolen radio to compromise the system by transmitting an unauthorized transmission.

We claim:

1. In a wireless communication system, a method for detecting unauthorized use of a communication unit, the method comprising the steps of;

a) transmitting, via a second transceiver of the communication unit, a user identification signal to a proximity user card over a second RF communication path;

b) determining, by the communication unit, whether a response has been received via the second transceiver from the proximity user card over the second RF communication path;

c) when the response has not been received, setting, by the communication unit, a proximity message to produce an invalid proximity message; and d) transmitting, via a first transceiver of the communication unit, a service request and the invalid proximity message over a first RF communication path to a central controller of the wireless communication system.

2. The method of claim 1 further comprising the steps of:

e) receiving, by the central controller, the service request and the invalid proximity message;

f) routing, by the central controller, the service request and the invalid proximity message to a system manager terminal; and g) upon input from a system manager, processing a response to the service request and the invalid proximity message.

3. The method of claim 2, wherein step (g) further comprises disabling the communication unit.

4. The method of claim 1 further comprising the steps of:

e) receiving, by the central controller, the service request and the invalid proximity message; and f) upon reception of the service request and the invalid proximity message, determining, by the central controller, a geographic location of the communication unit based on the service request.

5. In a wireless communication system, a method for detecting unauthorized use of a communication unit, the method comprising the steps of;

a) transmitting, via a second transceiver of the communication unit, a user identification signal to a proximity user card over a second RF communication path;

b) determining, by the communication unit, that a response has been received via the second transceiver from the proximity user card over the second RF communication path;

c) when the received response is invalid, setting, by the communication unit, a proximity message to produce an invalid proximity message; and d) transmitting, via a first transceiver of the communication unit, a service request and the invalid proximity message over a first RF communication path to a central controller of the wireless communication system.

6. The method of claim 5 further comprising the steps of:

e) receiving, by the central controller, the service request and the invalid proximity message;

f) routing, by the central controller, the service request and the invalid proximity message to a system manager terminal; and g) upon input from a system manager, processing a response to the service request and the invalid proximity message.

7. The method of claim 6, wherein step (g) further comprises disabling the communication unit.

8. The method of claim 5 further comprising the steps of:

e) receiving, by the central controller, the service request and the invalid proximity message; and f) upon reception of the service request and the invalid proximity message, determining, by the central controller, a geographic location of the communication unit based on the service request.

9. In a wireless communication system, a method for detecting authorized use of a communication unit, the method comprising the steps of;

a) transmitting, via a second transceiver of the communication unit, a user identification signal to a proximity user card over a second RF communication path;

b) determining, by the communication unit, that a response has been received via a second transceiver from the proximity user card over the second RF communication path;

c) when the received response is valid, clearing, by the communication unit, a proximity message to produce a valid proximity message; and d) transmitting, via a first transceiver of the communication unit, a service request and the valid proximity message over a first RF communication path to a central controller of the wireless communication system.

10. The method of claim 9 further comprising the steps of:

e) receiving, by the central controller, the service request and the valid proximity message;

f) routing, by the central controller, the service request and the valid proximity message to a system manager terminal; and g) upon input from a system manager, processing a response to the service request and the valid proximity message.

* * * * *

UNITED STATES PATENT AND TRADEMARK OFFICE
CERTIFICATE OF CORRECTION

PATENT NO. : 5,638,423

DATED : June 10, 1997

INVENTOR(S) : Grube, et al.

It is certified that error appears in the above-indentified patent and that said Letters Patent is hereby corrected as shown below:

In the Abstract:

On line 8, between "proximity" and (115) please insert --user card--.

Signed and Sealed this

Twenty-eighth Day of October, 1997

Attest:

BRUCE LEHMAN

Attesting Officer

Commissioner of Patents and Trademarks